Aug. 31, 1965                 C. J. EVANS                    3,203,188
           METHOD AND APPARATUS FOR PREPARING A TRENCH FOR A SUBSURFACE
                     CONDUIT LINE AND FOR LAYING SUCH A LINE
Filed Oct. 23, 1961                                    6 Sheets-Sheet 1

INVENTOR.
CLIFFORD J. EVANS
BY Paul A. Weilcin
ATTORNEY.

Aug. 31, 1965 C. J. EVANS 3,203,188
METHOD AND APPARATUS FOR PREPARING A TRENCH FOR A SUBSURFACE
CONDUIT LINE AND FOR LAYING SUCH A LINE
Filed Oct. 23, 1961 6 Sheets-Sheet 3

INVENTOR.
CLIFFORD J. EVANS
BY
Paul A. Weilein
ATTORNEY.

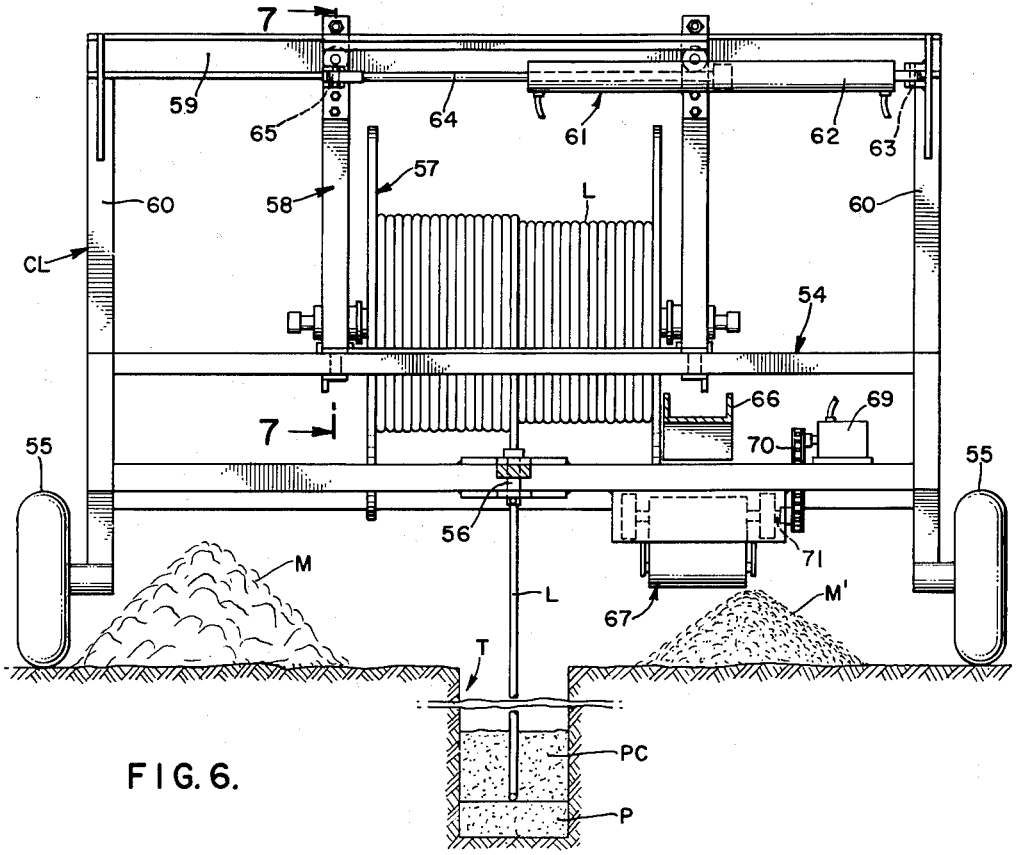
FIG. 6.
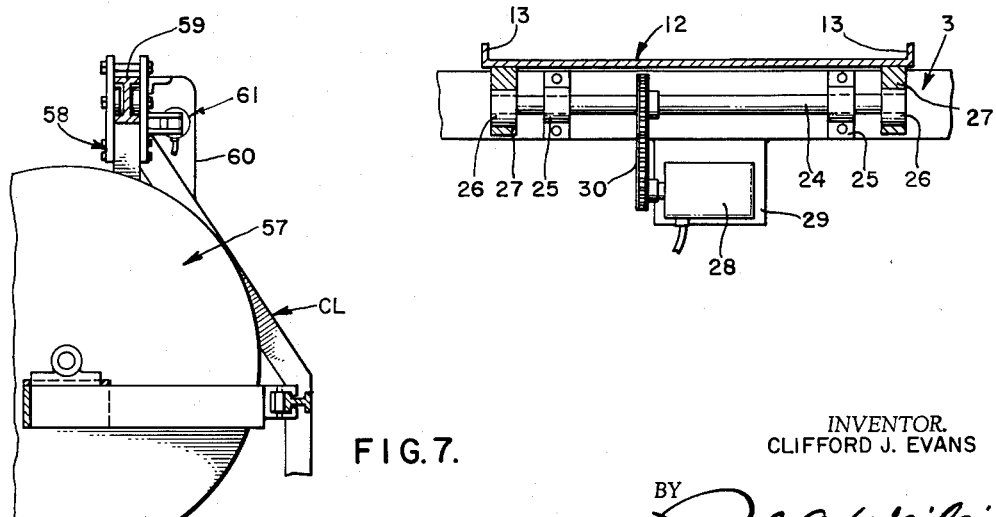
FIG. 5.
FIG. 7.
INVENTOR.
CLIFFORD J. EVANS
BY Paul A. Weilein
ATTORNEY.

Aug. 31, 1965 C. J. EVANS 3,203,188
METHOD AND APPARATUS FOR PREPARING A TRENCH FOR A SUBSURFACE
CONDUIT LINE AND FOR LAYING SUCH A LINE
Filed Oct. 23, 1961 6 Sheets-Sheet 5

FIG. 8.

INVENTOR.
CLIFFORD J. EVANS
BY *Paul A. Weilein*
ATTORNEY.

Aug. 31, 1965 C. J. EVANS 3,203,188
METHOD AND APPARATUS FOR PREPARING A TRENCH FOR A SUBSURFACE
CONDUIT LINE AND FOR LAYING SUCH A LINE
Filed Oct. 23, 1961 6 Sheets-Sheet 6
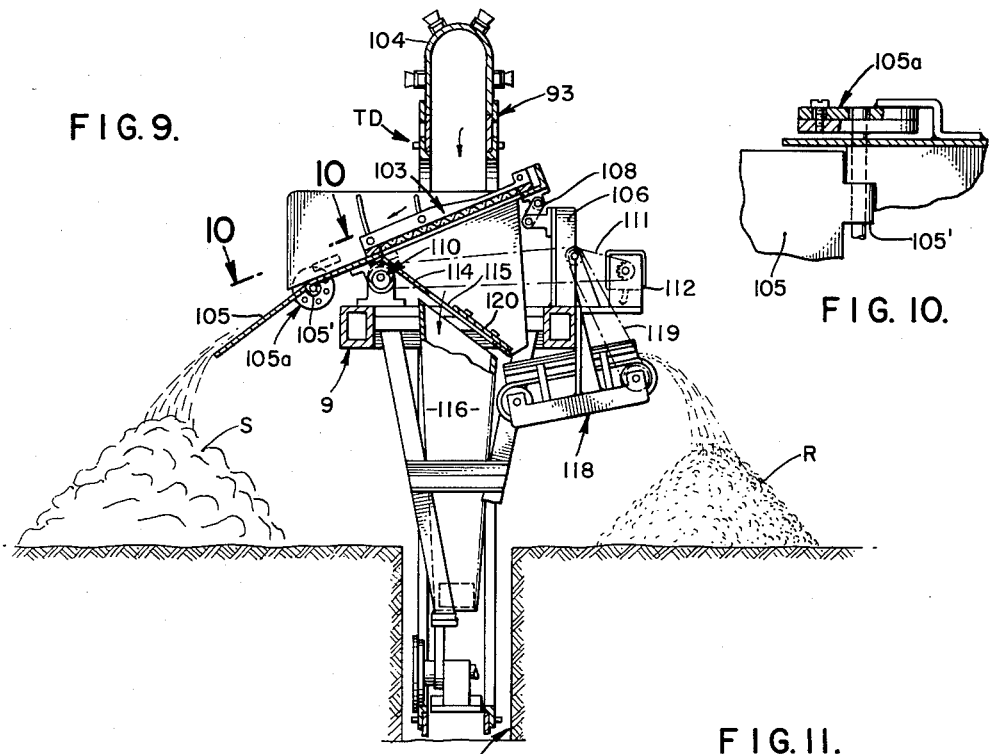
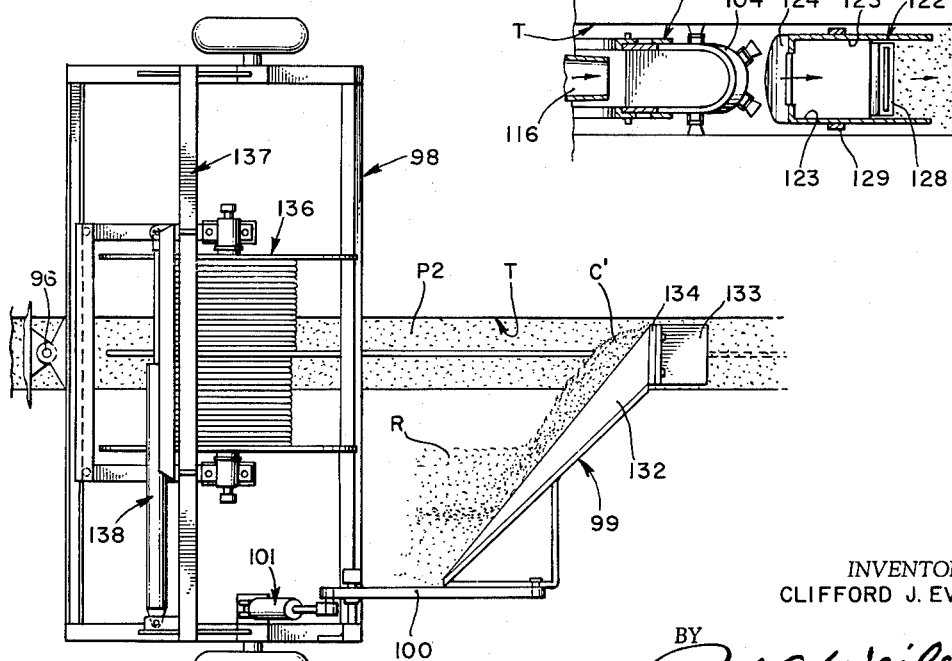
INVENTOR.
CLIFFORD J. EVANS
BY
Paul A. Weilein
ATTORNEY.

United States Patent Office 3,203,188
Patented Aug. 31, 1965

3,203,188
METHOD AND APPARATUS FOR PREPARING A TRENCH FOR A SUBSURFACE CONDUIT LINE AND FOR LAYING SUCH A LINE
Clifford J. Evans, Pasadena, Calif., assignor to Jetco, Inc., Alhambra, Calif., a corporation of California
Filed Oct. 23, 1961, Ser. No. 146,945
8 Claims. (Cl. 61—72.6)

This invention relates to the art of laying subsurface conduit lines.

Certain types of conduits, for example, electrical cables and other conduits that are sensitive to being forcibly struck as well as to contact with large and hard portions of irregular ground, when laid as subsurface lines in a trench or ditch, are likely to be impaired or damaged to the point of failure if disposed in contact with rocks or large and irregular particles of ground or if rocks or large, irregular and hard particles of earth are dumped into the trench so as to fall upon such a cable or conduit.

Accordingly, it is an object of this invention to provide a novel method of preparing a trench in which a conduit of the nature above noted may be laid as a subsurface line and covered without likelihood of being damaged or failing in its purpose due to the causes above noted.

It is another object of this invention to provide novel apparatus for preparing a trench in which a conduit line such as described may be laid and maintained without likelihood of damage or failure due to the presence of rocks and irregular ground or the rocks or lumps of earth being dumped on the conduit line in the covering of the latter.

It is a further object hereof to provide a novel method of progressively preparing a trench such as described and for progressively laying and covering a conduit line therein as the formation of the trench progresses, all in a manner assuring that the conduit line will be safeguarded against damage or failure due to the causes aforementioned.

It is another object of this invention to provide a method such as described which consists in progressively digging out ground along a given path to form a trench, separating fine and coarse particles of earth removed during the progressive formation of the trench, and then progressively depositing on the bottom of the trench an amount of the separated fine particles to form a continuous and protective pad of such fine particles on which a conduit may be laid in preparation for being covered in the trench.

More specifically, it is an object of this invention to provide a method such as next above described which includes the steps of laying a conduit in the trench on the pad of fine particles of earth during the progressive formation of the trench and then depositing a further amount of such separated fine particles so as to cover and protectively surround the conduit line laid on the pad.

A further and more specific object of this invention is to provide apparatus of the character described wherein a power-operated ditch digging or trenching machine is equipped with means for separating the coarse and fine particles of earth removed in digging the trench, means for depositing some of the fine particles into the bottom of the trench to form a protective pad, means for laying the conduit on the pad, and means for covering the conduit with more of the separated finer particles to form a protective surrounding cover for the conduit.

It is a further object of this invention to provide a combined trench digging and conduit laying apparatus such as described which, while progressively forming a trench, will operate as follows: to cast onto the surface of the ground to one side of the trench, the rocks and larger portions of the earth removed in digging the trench; to cast onto the ground on the other side of the trench an amount of the fine particles of such remover earth; to direct onto the bottom of the trench an amount of the finer particles of such removed earth that will form a continuous cushing pad for supporting a conduit; to progressively lay a conduit on the cushing pad; and to direct an additional amount of the separated finer particles of earth into the trench to progressively cover the conduit laid on the cushioning pad. The excess fine particles deposited to one side of the trench are subject to use as desired as additional fill or cover in the trench.

An additional object of this invention is to provide combined trench digging and conduit laying apparatus similar to that next above noted, but wherein the covering layer of fine particles of earth which is deposited in the trench over the conduit is derived from the pile or mound of such fine particles that has been deposited on one side of the mouth of the trench during the digging of the latter, there being attached to the rear of the cable laying unit, suitable shoe means which will sweep such fine particles into the trench to thereby cover the conduit.

Other objects and advantages of the invention will be hereinafter described or will become apparent of those skilled in the art, and the novel features of the invention will be defined in the appended claims.

Referring to the drawings:

FIG. 5 is an enlarged sectional view taken on the line 5—5 of FIG. 3;

FIG. 6 is an enlarged sectional view taken on the line 6—6 of FIG. 1;

FIG. 7 is a sectional view taken on the line 7—7 of FIG. 6;

FIG. 7a is an enlarged sectional view taken on the plane of line 7a—7a of FIG. 2;

FIG. 8 is a side elevation partly in section of a modified form of apparatus embodying the present invention as it would appear when in use;

FIG. 9 is an enlarged sectional view taken on the line 9—9 of FIG. 8;

FIG. 10 is a fragmentary sectional view on an enlarged scale taken on the line 10—10 of FIG. 9;

FIG. 11 is a fragmentary sectional view taken on the line 11—11 of FIG. 8; and

FIG. 12 is a top plan view of the cable laying portion of the apparatus shown in FIG. 8 as it would appear when in operation.

Figure 2:
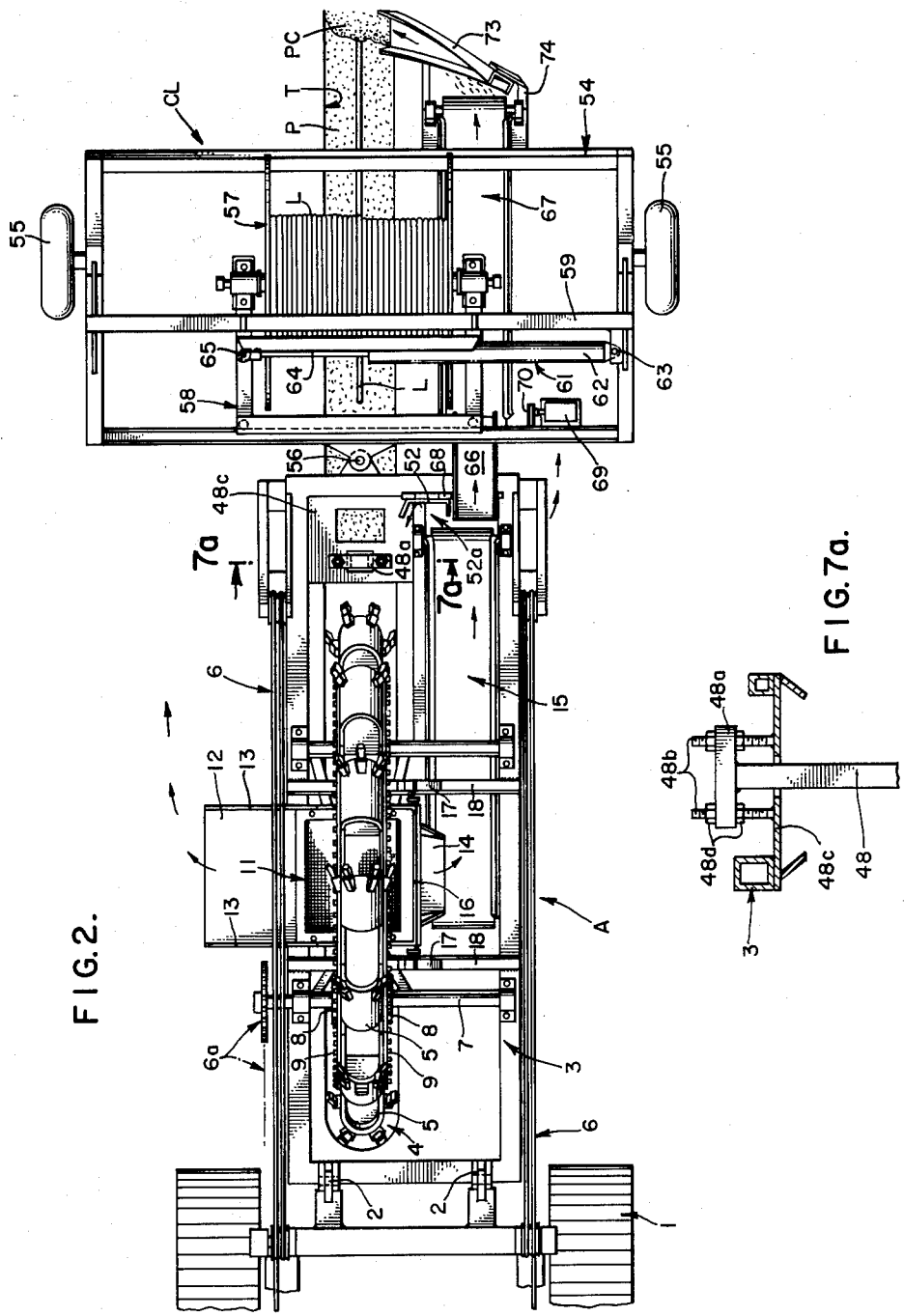
FIG. 2 is a top plan view of the apparatus shown in FIG. 1.

The present invention is carried out as shown in the accompanying drawings, in connection with a conventional trench digging machine A to which is added or connected the elements and parts constituting the apparatus of this invention. As this form of trenching machine is well known, it will be but briefly described, and as here depicted, includes a track laying type tractor 1 to which is pivotally connected as at 2, a vertically adjustable frame 3 for supporting a power-driven digging wheel 4 having the usual digging buckets 5 mounted on the periphery thereof. Means generally designated 6 are provided to vertically adjust the frame 3 to position the digging wheel 4 for digging trenches of different depths. The means driving the wheel derives its power from the tractor and, as schematically indicated in FIG. 2, consists of a chain and sprocket drive 6a for driving a shaft 7 on the frame 3, which shaft drives pinions 8 meshing with and driving ring gears 9 carried by the wheel 4. The wheel is rotatably supported in the customary manner on bearing rollers 10 on the frame 3.

Figure 3:
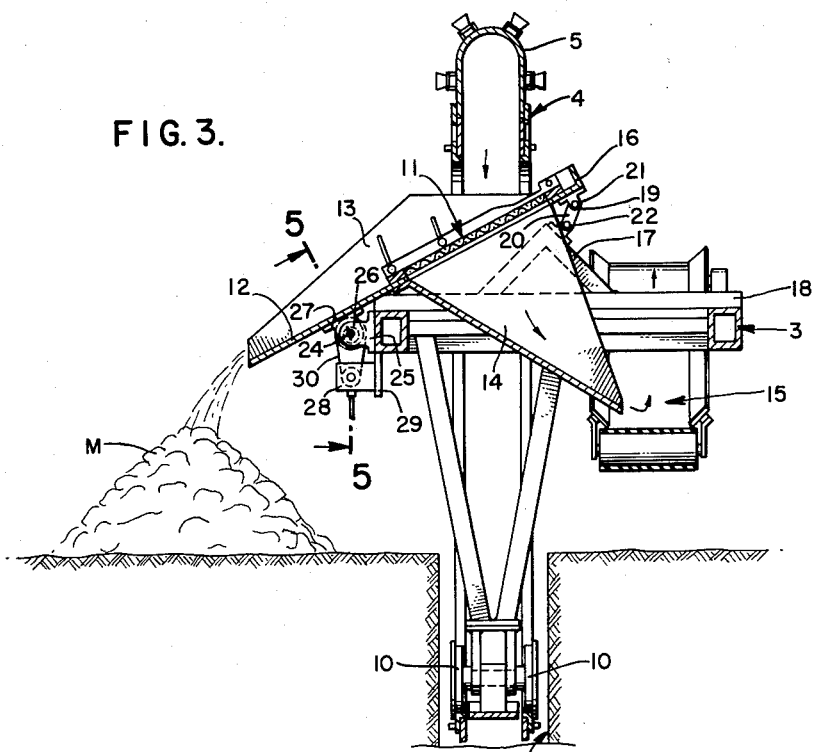
FIG. 3 is a sectional view taken on the line 3—3 of FIG. 1 on an enlarged scale.

Means are provided in accordance with this invention for treating the earth removed by the digging buckets 5 to separate the fine particles of such earth from rocks and larger particles. For this purpose, as shown in FIG. 3, a vibratory separator screen 11 is supported on the frame 3 within the wheel 4 in position to receive the earth which gravitates from the buckets when the latter reach the top of the wheel. As here shown, the screen 11 is inclined from the horizontal so that any rocks and large particles deposited thereon will gravitate therefrom onto a chute 12 attached to the screen and positioned to discharge such rocks and coarse material onto the surface of the ground adjacent one side of the mouth of the trench T to form a row or mound M of such material. The chute 12 has side walls 13 which extend along the sides of the screen 11 to aid in confining the earth dropped from the buckets 5 to the area of the screen.

The mesh of the screen 11 is such that only the fine particles of earth will drop therethorugh onto an inclined chute 14 attached to the underside of the screen and arranged to discharge the fine earth onto an endless conveyor 15. This conveyor, together with associated elements, will operate to distribute the fine earth into the trench and alongside the trench in a manner and for the purposes to be hereinafter described.

Figure 1:
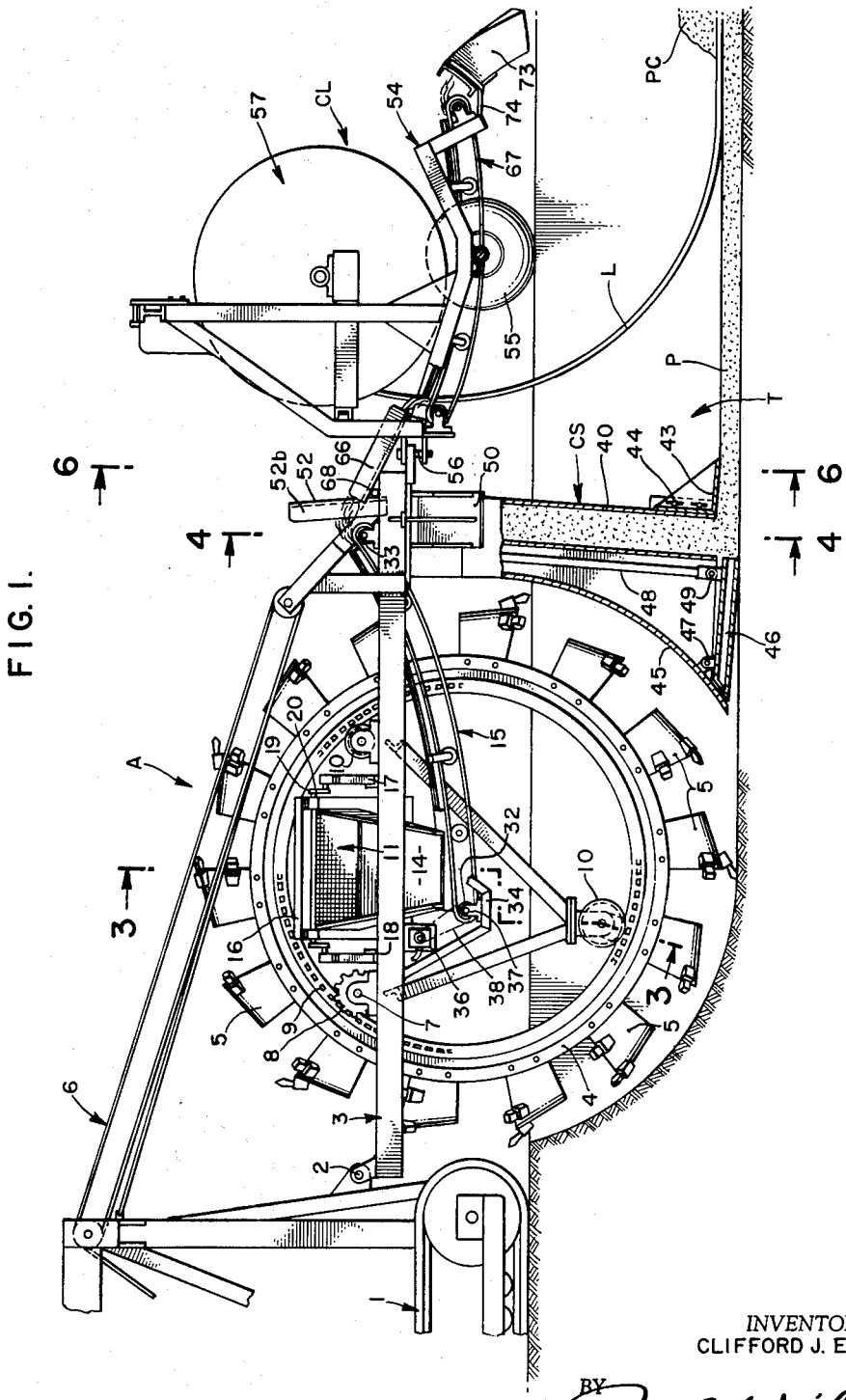
FIG. 1 is a side elevation partly in section of apparatus embodying the present invention, as it would appear when in use.

It is desired that the separator screen 11 be mounted and agitated in a manner for effecting an efficient screening action to screen out an optimum of fine earth while discharging rocks and large particles of earth to one side of the trench. For this purpose, as shown in FIGS. 1 and 3, the frame 16 of the inclined screen 11 is connected in a particular manner at its upper end to upright frame members 17 on the transverse frame members 18 of the frame 3. This particular connection affords a gyratory movement of the screen and is effected by means of a transverse shaft 19 on the screen frame 16 and links 20 pivoted as at 21 to the ends of the shaft 16 and as at 22 on the frame members 17. The links are inclined to the right from the vertical, and this, with the pivotal arrangement thereof, makes the upper end of the screen 11 subject to a gyratory movement about the axes of the links 20 when the screen is agitated as here provided. Since the chute 12 is fixed to the lower end of the screen frame 16, the agitating force for the screen is applied through this chute by power-driven means best shown in FIGS. 1 and 5. This agitating means includes a shaft 24 that is extended across the underside of the chute 12 in bearings 25 and has disk members 26 eccentrically mounted on the ends thereof and disposed in bearings 27 on the frame 3 as shown in FIG. 3.

A reversible motor 28 supported by brackets means 29 on the frame 18, as shown in FIG. 5, drives the shaft 24 through a chain and sprocket drive unit 30 to thereby agitate the screen 11 and chutes 12 and 14 carried by the screen. The motor 28 may be operated by fluid under pressure derived from the conventional hydraulic system, not shown, of the tractor 1 or by electrical power, also not shown, which is supplied from the tractor. As the links 20 are inclined to the right of the vertical, it will be seen that if the motor 28 is operated to turn the shaft 24 and eccentric disks 26 in a clockwise direction, the upper end of the screen 11 will be lowered and will gyrate about the axis of the pivots 22, thereby lessening the inclination of the screen and causing a larger dwell of the earth thereon for a more thorough separation of the fine and coarse particles of earth. Operation of the motor 28 in a counterclockwise direction increases the inclination of the screen for varying the screening action.

In accordance with this invention, means are provided for distributing the fine particles of earth separated at the screen 11 so that an amount of such earth is progressively deposited along the bottom of the trench T to provide a layer of fine particles, for example, six or more inches in depth as a protective and cushioning pad P on which a conduit may be laid. It is also desired that this distributing means operate to deposit a row or mound M' of the fine particles of earth alongside the trench for use as a filler for the trench.

In addition, it is desired that the distributing means operate following the layer of a conduit or cable on the pad P to conduct some of the fine earth into the trench as a protective cover PC for the conduit. This operation takes place when, as here shown, a conduit or cable laying unit CL is attached to the trench digger as a trailer and operates to lay a cable or conduit on the pad as the trench digger progressively forms the trench.

The pad P and cover PC of the fine earth serve as a protective enclosure for a conduit or cable which is sensitive to contact with rocks and hard and irregular surfaces, as well as sensitive to blows such as would be occasioned in dumping into the trench such rocks and irregular clumps of earth so as to strike the cable or conduit laid in the trench. Thus, the pad P and cover PC prevent impairment and damage of the conduit as well as greatly reduce the likelihood of failure of the cable or conduit as a result of such impairment or damage.

The chute 14 and conveyor 15 constitute a part of the above mentioned distributing means, the conveyor 15, as shown in FIGS. 1 and 3, being supported on rollers 32 and 33 carried by a depending frame portion 34 of the main frame 3 and by the latter, respectively. With this arrangement, the conveyor extends upwardly and rearwardly from the end portion thereof disposed beneath the chute 14. The rear end of the conveyor 15 is disposed, as shown in FIGS. 1, 2 and 4, to transfer the fine material to other elements of the distributing means for such material, in a manner to be hereinafter described.

As shown in FIG. 1, the conveyor 15 is driven by a motor 36 supported on the frame 3 and drivingly connected with the shaft 37 for the conveyor roller 32, by means of the chain and sprocket drive unit 38. The motor 36, like the motor 28, may be fluid pressure operated and controlled from the tractor to appropriately drive the conveyor 15.

Figure 4:
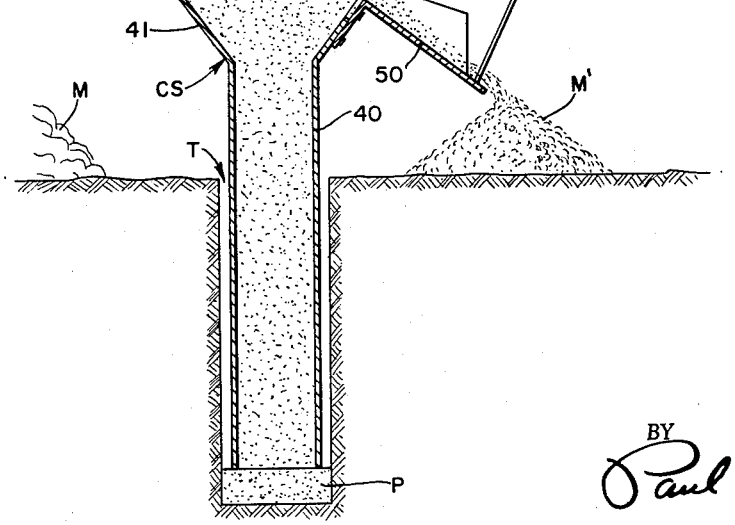
FIG. 4 is an enlarged sectional view taken on the line 4—4 to FIG. 1.

That part of the distributing means for the fine earth that is operable to form the continuous pad P in the bottom of the trench includes a combined chute and shoe unit CS which, as shown in FIGS. 1 and 4, depends from the rear end of the main frame 3 so as to be disposed in the trench. The unit CS includes a tubular substantially vertically disposed chute 40 which serves as a hopper and is enlarged and flared as at 41 at its upper end for reception of a portion of the fine earth discharged from the conveyor 15. The fine earth thus entering the hopper chute member 40 collects or stores therein, since the lower end of this member is open and disposed in somewhat upwardly spaced relation from the bottom of the trench. As the apparatus advances in progressively forming the trench, the fine particles of earth in the member 40 are discharged therefrom along the bottom of the trench and, as shown in FIG. 1, a flattening and leveling shoe 43 is vertically adjustably mounted as at 44 on the rear of the member 40 and causes the pad P to be formed of a given depth and to be leveled along the upper surface. The depth may be of the order of from six or more inches and, of course, will vary depending upon the diameter and type of conduit to be laid.

The chute and shoe unit CS also includes, as shown in FIG. 1, an arcuate scoop member 45 disposed on the front side of the chute 40 and provided with an adjustable plate-like shoe 46 pivoted as at 47 at the rear of the scoop. The scoop 45 will sweep ahead of it any rocks or loose ground in the trench, whereas the shoe 46 will sweep along the bottom of the trench in contact therewith to prepare the bottom for the reception of the fine earth that forms the pad P. Suitable means for changing the angle at which the shoe 46 contacts the bottom of the trench are provided. This means, as shown in FIGS. 1 and 7a, includes a rod 48 pivoted at its lower end as at 49 to the shoe 46 and adjustably connected as best shown in FIG. 7a, with a plate 48c carried by main frame 3. A bar 48a is welded to the upper end of the rod 48 so that studs 48b fixed on the plate 48c may be extended therethrough. Nuts 48d threaded on the studs 48b above and below the bar 48a, upon being appropriately turned, will raise or lower the rod 48 to adjust the shoe 46 as desired.

With reference to FIGS. 1 and 4, it will be seen that that a portion of the fine earth discharged by the conveyor 15 will enter the chute 40 and another portion of such discharged earth will enter a chute 50 mounted on the frame 3 to one side of the chute 40. The chute 50 is inclined away from the aparatus and discharges the fine earth deposited thereon onto the surface of the ground adjacent the mouth of the trench to form the row or mound M', as seen in FIGS. 4 and 6. The remainder of the fine earth discharged by the conveyor 15 is conveyed into the trench in a manner which will be hereinafter fully described.

This distribution of the fine earth discharging from the conveyor 15 is controlled, as shown in FIGS. 1 and 4, by means of an upstanding baffle plate 52 mounted on the frame 3 so as to intercept some of the fine earth discharging from the conveyor. The conveyor 15 is of greater width than the baffle plate 52 and the latter is spaced outwardly from the end of the conveyor, thereby leaving an open space designated 52a through which a part of the fine earth may drop into the chute 40. Moreover, portions of the fine earth discharged by the conveyor will pass to one side of the baffle plate 52 for delivery, as will be hereinafter described, into the trench as a cover for the conduit laid in the trench. Furthermore, some of the fine earth discharged from the conveyor 15 will strike the baffle plate 52 and fall into the chute 40 as well as into the chute 50, there being side walls 52b on the plate 52 to confine the earth that strikes the plate to movement into the chutes 40 and 50, respectively.

The cable laying unit CL as here shown, includes a frame 54 mounted on a pair of wheels 55 so as to straddle the trench T. The frame 54 is detachably coupled to the rear end of the main frame 3 of the trencher by coupling means 56.

A reel 57 containing a supply of cable L to be laid in the trench is laterally adjustable supported on the frame 54 by means of a carriage 58 depending from and laterally shiftable on a horizontal bar 59 supported by upright frame members 60 and extending transversely of the frame 54. It is desired that the reel 57 be shifted as required so as to lay the cable L in the center of the trench as indicated in FIG. 6. Shifting of the carriage 58 suporting the reel is effected by means of a piston and cylinder unit 61 mounted on one of the frame members 60 and connected to the carriage 58, as shown in FIG. 6. The cylinder 62 of this unit is pivoted as at 63 to one of the frame members 60, whereas the piston 64 is pivotally connected as at 65 to the carriage 58. The cylinder may be supplied with fluid under pressure and controlled from the tractor in any suitable manner, which is not believed necessary to illustrate, for the purpose of shifting the carriage 58 to center the reel with respect to the trench. The cable is suitably guided from the reel into the trench as shown in FIGS. 1 and 6 so as to lie in the center of the trench and to unreel as the apparatus is advanced in the formation of the trench.

The distributing means for the fine earth developed at the screen also includes means for depositing into the trench sufficient of this earth to provide the protective cover PC for the conduit or cable. As shown in FIGS. 1, 2 and 6, particularly FIG. 2, some of the fine earth discharged by the conveyor is directed to one side of the baffle 52 into a chute 66 which is inclined to discharge the fine earth onto an endless conveyor 67 carried by the frame 54 of the cable laying unit CL, the chute 66 being secured to the frame 3 as at 68. The conveyor 67 is driven by a motor 69 and a chain and sprocket unit 70 driving one of the conveyor rollers 71. The motor 69 is suitably mounted on the frame 54 and supplied with power from and controlled at the tractor 1 in any suitable manner. The conveyor 67 extends with the discharge end thereof rearwardly of the frame 54 so as to discharge the fine earth into a chute 73 suitably fixed as at 74 at one end of the frame 54 and inclined so that the fine earth deposited therein from the conveyor 67 will be dumped into the trench T, as best shown in FIG. 2, to form the cover PC over the conduit. This cover may be, for example, in the order of 12 or more inches in depth, the depth depending upon the nature of the conduit or cable. In this connection, it should be noted that should it be desired to lay another cable or conduit after the first one is laid, the additional cable could be laid upon the cover PC and thereafter covered by utilizing some of the fine earth deposited in the mound or row M' along the side of the trench. It is obvious that after the conduit or cable is adequately covered with fine earth, the coarser material deposited to one side of the trench may be used to complete the fill.

A modified form of apparatus embodying this invention is shown in FIGS. 8–12 and includes a trench digging machine of conventional form generally designated TD and which includes a vertically adjustable frame 90 pivotally connected as at 91 to the tractor unit 92. A conventional digging wheel 93 is mounted on the frame 90 in the usual manner and may be positioned for digging trenches of different depths according to adjustment of the frame adjusting means generally designated 94.

Coupled to this trencher by the use of suitable coupling means 96 is a wheeled cable laying unit 98 which supports a shoe unit 99 operable to sweep fine material deposited on one side of the trench in a mound or row R, as shown in FIG. 12, into the trench to form a cover C', as shown in FIG. 8. The shoe unit 99 is connected to the cable laying unit 98 by means of a pair of pivotally mounted arms 100, the upper of which serves as a lever and is connected to a hydraulic piston and cylinder unit 101 mounted on the frame of the cable laying unit 98. This piston and the cylinder unit is operable for adjusting the shoe unit 99 in a manner and for the purpose to be hereinafter fully described.

In this modified form of the invention, a vibratory separator screen 103 is mounted on the frame 90 for the digger wheel and is similar to the separator screen shown in FIG. 3. The earth gravitating from the buckets 104 at the top of the wheel will fall upon the screen 103 and the rocks and large particles of such earth will be discharged over a chute 105 pivotally joined as at 105' to the lower end of the screen and which directs this coarse material so as to form a mound or row S, as shown in FIG. 9, on one side of the trench. As shown in FIG. 10, the adjusting means 105a provides for setting the chute in differently inclined positions. The upper end of the screen 103 is pivotally connected to the upward extension 106 of the frame 90 by means of a pair of upwardly and rearwardly inclined links 108 which afford gyratory movement of the screen in the same manner as provided in the first described form of this invention. Adjacent its lower end, the screen 103 is mounted on the frame 90 by an eccentric driving means generally designated 110 whereby the screen may be agitated to effect the desired separation of the fine and coarse particles of earth. This eccentric agitating means 110, as here shown, is operated by a chain and sprocket drive unit 111 driven by a motor 112 carried on the frame 90. This motor may be operated by fluid pressure derived from and controlled at the tractor unit 92. Preferably, the motor 112 is reversible so that the angular disposition of the screen may be varied according to the direction in which the eccentric agitating means 110 is driven, in substantially the same manner as described in connection with the screen of the first described form of this invention.

The fine material sifting through the screen 103 drops onto a chute 114 which is inclined toward one side of the digging wheel and is provided with an opening 115 intermediate its ends to allow an amount of the fine earth deposited thereon to gravitate into a chute 116 arranged to direct such fine particles of earth onto the bottom of the trench to form a pad P2 corresponding to the pad P shown in FIGS. 1, 2 and 6.

That part of the fine earth gravitating onto the chute 114 which does not pass through the opening 115 will be discharged onto an endless conveyor unit 118 supported on the frame 90 and disposed to discharge the the fine earth to form the mound or row R on the surface of the ground along one side of the trench. This conveyor unit 118 is driven by a chain and sprocket unit 119, in turn driven from the chain and sprocket unit 111 operated by the motor 112. Control of the amount of the fine material that passes through the opening 115 may be effected by a slide plate 120 suitably adjustably mounted on the chute 114, for movement to increase or decrease the size of the opening 115.

Means are provided to confine the fine earth discharged from the chute 116 to form the pad P2 of such fine material along the bottom of the trench. In this connection, it should be noted that the wheel 93 is open at points between the buckets 104 and that the lower end of the chute 116 is positioned to discharge through this open space into a shoe unit 122 depending from the frame 90 into the trench. This shoe unit is formed with a tubular member 123 into which the fine material is discharged from the chute 116 and which is open on its lower end whereby the material will be deposited on the bottom of the trench, the member 123 acting somewhat as a hopper. Ahead of the member 123 and joined thereto is a scoop portion 124 of the unit 122 which is similar to that shown in the first described form of the invention and serves to sweep up rocks and loose particles in the trench as well as to sweep the bottom of the trench in advance of the outlet for the tubular member 123. Fixed to the rear portion of the unit 122 adjacent the lower end of the tubular member 123, is a leveling shoe 126 which presses down on the fine material deposited by the member 123 and levels the surface thereof to progressively form the pad P2 for the conduit or cable. The scoop portion 124 has a flat shoe 128 pivoted thereto to travel along the bottom of the trench. Means generally designated 129 is connected to the shoe 128 and to the upper part of the unit 122 as at 130 and is operable to vary the angle of the shoe 128 with respect to the bottom of the trench.

Referring more specifically to the shoe unit 99, it will be noted that it includes a shoe member 132 which will sweep along the surface of the ground to one side of the trench as shown in FIG. 12 to dump into the trench a part of the fine material deposited in the row or mound R on the surface of the ground so as to cover the conduit on the pad in the bottom of the trench. A leveling shoe 133 is mounted on an arm 134 depending from the shoe 132 into the trench. This shoe 133 will press down and level the fine material which is swept into the trench by the shoe 132 to form the cover C' of substantially uniform height. The adjusting means 101 for the shoe unit 99 may be actuated to determine the position of the shoes 132 and 133 in order to regulate the amount of material swept into the trench and the height of the cover C'. Moreover, the shoes 126 and 133 are vertically adjustably mounted on the same manner as the shoe 43 in the first described form of the invention to regulate the height of the pad P2 and the cover C' respectively.

It should be noted that the cable laying unit 98 is provided with a reel 136 which is mounted for transverse adjustment on the frame 137 of the unit to center the cable during the laying thereof. Substantially the same means are employed for this purpose as shown in the first described form of the invention, there being a piston and cylinder actuating unit 138 for shifting the reel transversely. This unit 138 is supplied with power from and controlled at the tractor unit 92.

While specific structural details have been shown and described, it should be understood that changes and alterations may be resorted to without departing from the spirit of the invention as defined in the appended claims.

I claim:

1. Apparatus for preparing a trench for a subsurface conduit line and laying such a line, comprising: a trenching machine having digging means operable for progressively removing ground along a given path to form a trench; separating means connected to said machine operable to separate from the ground removed in the forming of the trench, the finer particles of such ground; discharging means operatively connected with said separating means for discharging the coarse particles of such removed ground on the surface of the ground to one side of the mouth of the trench; a first depositing means operatively connected with said separating means for depositing on the surface of the ground on the other side of the mouth of said trench, a pile of said fine particles that is subject to use in filling the trench; a second depositing means operatively connected with said separating means for depositing along the bottom of said trench an amount of said fine particles to form a pad for supporting a conduit; conduit laying means connected to said machine operable to lay a conduit on said pad; and conduit covering means operatively connected to said machine for depositing into the trench from said pile on the ground an amount of said fine particles for covering the conduit laid on said pad.

2. Apparatus for preparing a trench for a subsurface conduit line and laying such a line in said trench, comprising: a trenching machine digging means operable for progressively removing ground along a given path to provide a trench; separating means connected with said machine operable to separate from the ground so removed, the fine particles of said ground; a first depositing means operatively connected with said separating means for depositing along the bottom of said trench a quantity of said fine particles of ground to provide a continuous pad; a second depositing means operatively connected with said separating means for depositing on the surface of the ground to one side of the mouth of said trench a pile of said separated fine particles; conduit laying means connected with said machine for laying a conduit line on said pad; and conduit covering means connected with said conduit laying means operable to sweep into the trench as said machine progresses, an amount of the fine particles from said pile sufficient to cover the conduit line on said pad.

3. Apparatus for preparing a trench for a conduit line, comprising: a trench digging machine operable for removing ground along a given path to form a trench; said machine including a power-operated digging wheel; a frame supporting said wheel; digging buckets on said wheel; screen means disposed on said frame to receive earth removed by said buckets and to effect separation of the coarse and fine particles of such earth; a first discharging means for discharging from said screen means onto the surface of the ground to one side of the trench, the coarse particles of such earth; a second discharging means located within said wheel operable to discharge from said screen means toward the bottom of said trench, an amount of said fine particles; and spreading means connected to said frame and operable in said trench to receive said fine particles discharged from said second discharging means and to spread such fine particles along the bottom of the trench in the form of a pad of substantially uniform depth.

4. Apparatus for preparing a trench for a conduit line, comprising: a trench digging machine operable for removing ground along a given path to form a trench; said machine including a power-operated digging wheel; a frame supporting said wheel; digging buckets on said wheel; screen means disposed on said frame to receive earth removed by said buckets and to effect separation of the coarse and fine particles of such earth; means for discharging from said screen means onto the surface of the ground to one side of the trench, the coarse particles of such earth; said wheel having openings in its periphery between said buckets; chute means mounted within said wheel for discharging from said screen means through openings in said wheel toward the bottom of said trench, some of the fine particles separated by said screen means; and means connected with said frame operable to receive said fine particles from said chute means and to spread such particles in a predetermined depth along the bottom of the trench to form a pad for supporting a conduit.

5. Apparatus for preparing a trench for a conduit line, comprising: a trench digging machine operable for removing ground along a given path to form a trench; said machine including a power-operated digging wheel; a frame supporting said wheel; digging buckets on said wheel; screen means disposed on said frame to receive earth removed by said buckets and to effect separation of the coarse and fine particles of such earth; means for discharging from said screen means onto the surface of the ground to one side of the trench, the coarse particles of such earth; said wheel having openings in its periphery between said buckets; chute means mounted within said wheel for discharging from said screen means through openings in said wheel toward the bottom of said trench, some of the fine particles separated by said screen means; means connected with said frame operable to receive said fine particles from said chute means and to spread such particles in a predetermined depth along the bottom of the trench to form a pad for supporting a conduit; and means for adjusting said last named means to vary the depth of the pad of such fine particles.

6. Apparatus for preparing a trench for a conduit line and laying such a line, comprising: a trench digging machine operable for removing ground along a given path to form a trench; said machine including a power-operated digging wheel; a frame supporting said wheel; screen means disposed on said frame to receive earth removed by said wheel and operable to separate the coarse and fine particles of such earth; a chute connected to said screen means for discharging said coarse particles therefrom onto the surface of the ground to one side of the mouth of the trench; a second chute connected to said screen means for receiving therefrom said fine particles; an upright open-ended tubular member connected to said frame; conveyor means mounted on said frame to receive said fine particles from said second chute and operable to discharge from one end thereof a portion of said fine particles thereon into the upper end of said tubular member; said tubular member having its lower end disposed to discharge said fine particles onto the bottom of the trench to form a pad of such particles; a baffle adjacent said discharge end of said conveyor means operable to deflect in a direction away from said tubular means some of the fine particles discharged by said conveyor means; a third chute on said frame for receiving said fine particles deflected by said baffle and discharging said deflected fine particles therefrom onto the surface of the ground on the other side of the mouth of the trench; a cable laying unit connected to said frame operable to lay a cable in said trench on said pad; a second conveyor means on said cable laying unit operable to receive a portion of the fine particles discharged from said first named conveyor means; and means carried by said cable laying unit operable to receive fine particles from said second conveyor means and to discharge such fine particles into the trench so as to cover the cable laid on said pad.

7. The method of laying a subsurface conduit, that comprises the steps of: progressively removing the ground along a given path to form a trench; upon removal from the trench treating the ground so removed to divide it into a coarse fraction and a fine fraction; dividing the fine fraction into two portions of which one portion is deposited progressively along the bottom of the trench to form a continuous pad; laying a conduit on the pad; progressively depositing on the pad and conduit the other portion of the fine fraction to provide a protective covering for the conduit; and subsequently returning the coarse fraction to the trench.

8. Apparatus for laying a subsurface conduit, comprising: a movable frame; trenching means on the frame operable to progressively remove soil along a given path to provide a trench; screening means on the frame and associated with the trenching means to receive soil therefrom and operable to separate the soil into a coarse fraction and a fine fraction; dividing means cooperable with said screening means to divide said fine fraction into two separate portions; chute means on the frame rearwardly of the trenching means operable to receive one of said portions of said fine fraction and to deposit said one portion of said fine fraction progressively along the bottom of said trench to provide a continuous pad; separate discharge means operable for discharging the coarse fraction of said soil from said screening means onto the ground to one side of the mouth of the trench; conduit laying means connected to and movable with said frame for progressively laying a conduit on said pad; said conduit laying means being disposed rearwardly of the chute means; and a second chute means disposed rearwardly of said conduit laying means and operable to deposit on said pad the other of said portions of said fine fraction to cover said conduit.

References Cited by the Examiner

UNITED STATES PATENTS

| | | | |
|---|---|---|---|
| 1,470,028 | 10/23 | Parker | 37—96 |
| 1,846,902 | 2/32 | Powell | 37—91 |
| 2,007,969 | 7/35 | Grodsky | 61—72.1 |
| 2,118,553 | 5/38 | Garlinger | 61—72.6 |
| 2,201,493 | 5/40 | Jorgensen | 94—40 |
| 2,783,698 | 3/57 | Bambi | 172—32 |
| 2,876,717 | 3/59 | Tityak | 61—72.1 |

FOREIGN PATENTS

| | | |
|---|---|---|
| 792,799 | 10/35 | France. |
| 410,900 | 5/34 | Great Britain. |

EARL J. WITMER, *Primary Examiner.*

WILLIAM I. MUSHAKE, JACOB L. NACKENOFF,
*Examiners.*